US012671260B2

(12) United States Patent
Kelkka et al.

(10) Patent No.: US 12,671,260 B2
(45) Date of Patent: Jun. 30, 2026

(54) CONTROLLER, SYSTEM AND METHOD

(71) Applicant: VALMET AUTOMOTIVE OYJ, Uusikaupunki (FI)

(72) Inventors: Juuso Kelkka, Salo (FI); Arto Kangas, Salo (FI)

(73) Assignee: Ioncor Ltd, Uusikaupunki (FI)

( * ) Notice: Subject to any disclaimer, the term of this patent is extended or adjusted under 35 U.S.C. 154(b) by 55 days.

(21) Appl. No.: 18/637,082

(22) Filed: Apr. 16, 2024

(65) Prior Publication Data

US 2024/0348074 A1 Oct. 17, 2024

(30) Foreign Application Priority Data

Apr. 17, 2023 (EP) ..................................... 23168228

(51) Int. Cl.
H02J 7/00 (2026.01)
(52) U.S. Cl.
CPC .................................... H02J 7/855 (2026.01)
(58) Field of Classification Search
CPC ..................................................... H02J 7/0063
USPC ............................................... 307/112, 10.1
See application file for complete search history.

(56) References Cited

U.S. PATENT DOCUMENTS

| | | | |
|---|---|---|---|
| 10,814,726 B2 | 10/2020 | Zeng et al. | |
| 2017/0269659 A1* | 9/2017 | Chen | G06F 1/263 |
| 2020/0094707 A1* | 3/2020 | Fukushima | H01M 10/48 |
| 2022/0255546 A1 | 8/2022 | Huo et al. | |
| 2022/0376489 A1 | 11/2022 | Kim et al. | |
| 2024/0039311 A1* | 2/2024 | Padmalayam | H02J 7/70 |
| 2024/0313269 A1* | 9/2024 | Liu | G06F 11/0757 |
| 2024/0348061 A1* | 10/2024 | Jeon | H02J 7/00302 |

FOREIGN PATENT DOCUMENTS

| | | |
|---|---|---|
| CN | 209344264 U | 9/2019 |
| CN | 209479429 U | 10/2019 |
| CN | 111516497 A | 8/2020 |
| EP | 3 819 161 A1 | 5/2021 |

OTHER PUBLICATIONS

Extended European Search Report for European Patent Application No. 23168228.7, mailed Oct. 20, 2023 (7 pages).

* cited by examiner

*Primary Examiner* — Michael R. Fin
(74) *Attorney, Agent, or Firm* — Alston & Bird LLP

(57) ABSTRACT

Disclosed is a (safety) controller for a battery management system, a system and a method. The controller is arranged to provide control signals, receive an enable signal, receive a reset signal, and in response to the enable signal missing, perform a shutdown for the controller, and, based on the reset signal, cause a switch to be maintained in a closed position for connecting a battery to a load during the shutdown.

16 Claims, 4 Drawing Sheets

166 = OFF

166 = ON

CONTROLLER, SYSTEM AND METHOD

FIELD

The present disclosure relates to battery management systems.

BACKGROUND

A current state of the art for battery management systems (BMS), for example as per standard ISO26262, is that the controllers of the BMS such as the safety controller are provided with a power off/on hardware reset, resulting in main switch output driver shut off and interruption of the battery main current supply to the load. In some applications requiring high availability, the aforementioned reset interval cannot be secured, thus resulting in violation of the underlying safety concept and HARA (Hazard and Risk Assessment) basis.

OBJECTIVE

An objective is to provide an improvement over the state-of-the-art solutions for controllers for BMSs. In particular, an objective is to enable reset of a controller, such as a safety controller, without interruption of electric current supply between the battery and a load, e.g. battery main current supply.

SUMMARY

According to a first aspect, a controller, such as a safety controller, for a battery management system (BMS) is provided. The controller may be arranged to provide one or more control signals for operating a switch for connecting a battery to a load. It may be arranged to receive an enable signal for causing the controller to be maintained operational and a reset signal for indicating a reset of the controller. The controller may be further arranged, in response to the enable signal missing, to perform a shutdown for the controller. The controller may be arranged, based on the reset signal, cause the switch to be maintained in a closed position for connecting the battery to the load during the shutdown.

Herein, the switch being in the closed position (i.e. connecting the battery to the load) may also be referred as to the switch being closed. Conversely, the switch may be opened (i.e. disconnecting the battery from the load) into an open position, which may be referred as to the switch being open.

The solution allows facilitating an online reset of the controller. In contrast to a regular shutdown, the controller does not cause the switch to open when performing the shutdown. Instead, the switch can remain closed until the controller has completed the shutdown. It may be opened in response to the controller being powered down.

In an embodiment, the controller is arranged to cause an internal enable signal to be provided to a power management system controller for causing the controller to be powered during the shutdown. The controller may further be arranged to cause the internal enable signal to be disabled while causing the switch to be maintained in the closed position. This allows the power management system to cause the controller to be powered down while the switch remains closed.

In an embodiment, the reset signal is or comprises a digital input triggered by an external system controller and/or a signal included into a Controller Area Network (CAN) message. These allow the reset signal to be provided as a dedicated signal for indicating the controller that it is to be reset, not shutdown.

In an embodiment, the controller is arranged to cause the switch to be maintained in the closed position by maintaining an output of the one or more control signals during the shutdown. This allows an indication for opening the switch to be automatically provided when the controller is powered down as the controller loses its ability to provide the output. The output can thus be maintained until the end of the shutdown and until the controller is powered down. No separate switch control signal for opening the switch is therefore necessary.

According to a second aspect, a system comprises the controller according to the first aspect or any of its embodiments, alone or in any combination. The system may be a battery management unit (BMU) or the BMS. The system may further comprise a delay circuit arranged to receive the one or more control signals from the controller and, in response to the one or more control signals disappearing, maintain a switch-closing control signal for keeping the switch in the closed position for a (first) delay time. This allows the switch to be maintained closed while the controller resets itself within the (first) delay time. After reset, the controller may again provide the one or more control signals to the delay circuit, before the (first) delay time has elapsed. In response, the delay circuit may continue to maintain the switch-closing control signal without interruption.

In an embodiment, the (first) delay time is smaller than a fault tolerant time of the battery management system minus a fault diagnostics time of the controller minus a switch-opening time of the controller. This allows the switch to be opened within the fault tolerant time even when the controller returns operational near the end of the (first) delay time in the presence of a fault. The fault tolerant time may correspond to a fault tolerant time interval, for example in accordance with ISO 26262 standard. The switch-opening time may correspond to a time required for the controller to react to an event requiring the switch to be opened and to cause the switch to be opened. This may involve an intentional delay to allow the load to disconnect orderly.

In an embodiment, the delay circuit comprises a watchdog and/or a pulse counter circuit. These can provide the disclosed functionality with increased effectiveness.

In an embodiment, the system comprises an additional delay circuit arranged to receive one or more status signals from an external system controller indicating system status, the system being arranged to cause the switch to open unless both the delay circuit and the additional delay circuit output a switch-closing control signal.

In an embodiment, the additional delay circuit is arranged to maintain a switch-closing control signal for keeping the switch in the closed position for a (second) delay time in response to the one or more status signals disappearing and in response to the one or more status signals indicating a status problem of the battery management system, e.g. indicating a control instruction for opening the switch, which instruction can thus be delayed. The additional delay circuit can thus be different from the delay circuit as it can provide a delay not only when the input signal (here the one or more status signals) disappears but also when it is negative. This allows improved control for negative status problems of the BMS.

According to a third aspect, a battery management system comprises the controller according to the first aspect or any of its embodiments, alone or in any combination, and/or the system according to the third aspect or any of its embodiments, alone or in any combination.

According to a fourth aspect, a method for a battery management system is disclosed. The method may comprise receiving an enable signal at a controller, such as a safety controller, for causing the controller to be maintained operational. It may also comprise providing one or more control signals from the controller for operating a switch for connecting a battery to a load. The method may comprise receiving a reset signal at the controller for indicating a reset of the controller. Finally, the method may comprise, in response to the enable signal missing, performing a shutdown for the controller, while, based on the reset signal, causing the switch to be maintained in a closed position for connecting the battery to the load. What is stated above regarding the other aspects and their embodiments applies also to the fourth aspect and its embodiments.

In an embodiment, the method comprises causing an internal enable signal to be provided from the controller to a power management system controller for causing the controller to be powered during the shutdown. The method may further comprise causing the internal enable signal to be disabled while causing the switch to be maintained in the closed position.

In an embodiment, the method comprises causing the switch to be maintained in the closed position by maintaining an output of the one or more control signals from the controller during the shutdown.

In an embodiment, the method comprises, in response to the one or more control signals disappearing, maintaining a switch-closing control signal by a delay circuit for keeping the switch in the closed position for a (first) delay time.

In an embodiment, the method comprises causing the switch to open unless both the delay circuit and an additional delay circuit arranged to receive one or more status signals from an external system controller indicating system status both output a switch-closing control signal.

In an embodiment, the method comprises maintain a switch-closing control signal by the additional delay circuit for keeping the switch in the closed position for a (second) delay time in response to the one or more status signals disappearing and in response to the one or more status signals indicating a status problem of the battery management system, e.g. indicating a control instruction for opening the switch, which instruction can thus be delayed.

According to a fifth aspect, a computer program product comprises instructions which, when the program is executed by a computer, cause the computer to cause the method according to the fourth aspect, or any of its embodiments alone or in any combination, to be carried out.

It is to be understood that the aspects and embodiments described above may be used in any combination with each other. Several of the aspects and embodiments may be combined together to form a further embodiment of the invention.

The present solution can allow a scheduled reset to be performed for the controller without opening the switch. Accordingly, the electric current supply between battery and the load can be maintained during the scheduled reset without an interruption. During the scheduled reset, the controller may be operatively disconnected from the switch due to the shutdown so that the state of the switch (open or closed) cannot be changed with the controller. However, the state of the switch may still be changed also during the scheduled reset by means of the delay circuit so that the switch is opened in case the controller does not return operative, for example within the first delay time.

The solution can be utilized with various battery management systems. In particular, it may be utilized for battery management systems for electric vehicles. It may be provided to meet the ISO 26262 standard, which sets forth stringent requirements for latent failures. Latent impact can be considered as a multipoint failure where a first failure disables a dedicated safety mechanism. The solution can particularly be used with battery management system having mandatory reset cycles. The controller can thus be reset without the need to disconnect the battery from the load.

BRIEF DESCRIPTION OF THE DRAWINGS

The accompanying drawings, which are included to provide a further understanding and constitute a part of this specification, illustrate examples and together with the description help to explain the principles of the disclosure. In the drawings.

Like references are used to designate equivalent or at least functionally equivalent parts in the accompanying drawings.

DETAILED DESCRIPTION

The detailed description provided below in connection with the appended drawings is intended as a description of examples and is not intended to represent the only forms in which the example may be constructed or utilized. However, the same or equivalent functions and structures may be accomplished by different examples.

Figure 1:
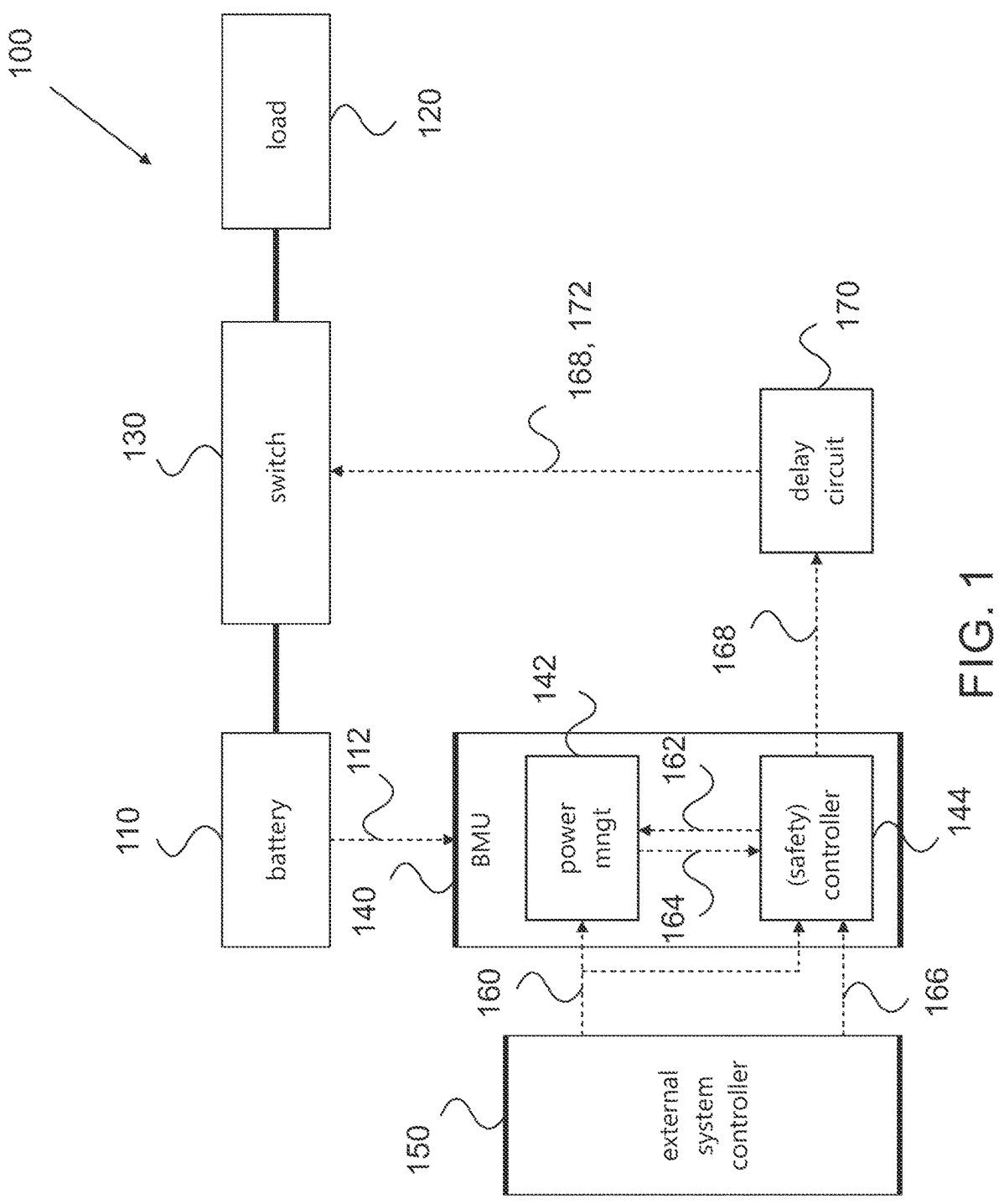
FIG. 1 illustrates a system according to an example.

FIG. 1 illustrates a system 100, which, at minimum, comprises a controller 144, such as a safety controller, for a battery management system (BMS). The system may comprise or consist of the battery management system. The system may comprise any or all of the components described herein or they may be provided external to the system. The battery management system may be a BMS for an electric vehicle, such as an electric car, or for any other type of an electric device, for example for a moving electric device or a stationary electric device. In an embodiment, the system is the electric vehicle or the electric device (moving or stationary).

The controller may be arranged to operate, e.g. to control opening of, a switch 130 for connecting a battery 110 to a load 120. The switch may be the main switch of the battery. The battery may comprise a drive battery for propulsion of the electric vehicle. The load may comprise a de link of the electric vehicle.

In particular, the controller may be arranged to provide one or more control signals 168 (herein also "the control signal(s)") for operating the switch. The controller may be arranged to provide the control signal(s) repeatedly or continuously so that an absence of the control signal(s), for example for a threshold time, will lead to the switch being opened. The system may thus be arranged to open the switch, thereby disconnecting the battery from the load, unless the controller maintains the control signal(s) for the switch. The control signal(s) may comprise or consist of one or more continuous signals and/or pulsed signals. The control signal(s) may be transmitted to the switch directly or indirectly.

The system may comprise a battery management unit (BMU) 140 of the BMS. The system, or the BMU, may comprise the controller but also various other subsystems, which are not illustrated here. The BMU may be arranged to control the switch but also, for example, pre-charging for the system. The battery may be coupled to the BMU, for example for providing battery information 112 from the battery to the BMU. The BMU may comprise one or more electronic circuit boards.

The system, or the BMU, may comprise a power management system controller 142 (PMSC), which may be arranged to cause the controller to be powered, e.g. by means of a power supply 164. The PMSC may be provided, e.g., by a system basis chip (SBC). As an example, the BMU may comprise a single electronics circuit board comprising one functional block providing the PMSC and another functional block providing the controller 144.

The PMSC 142 may be arranged to cause the power supply to be provided to the controller only if it receives one or more enable signals 160, 162. The PMSC may be arranged to receive one or more external enable signals 160 (herein also "the external enable signal(s)") from one or more external systems 150 (herein also "the external system (s)") such as an external system controller. The external system(s) may be provided external from the BMU but it may still be provided as part of the system 100. As an example, the external system controller may be a vehicle controller. The external system may thus be a vehicle, or the system 100 as a whole may be considered the vehicle comprising a BMS and the external system as a system external to the BMS.

The PMSC may also be arranged to receive one or more internal enable signals 162 (herein also "the internal enable signal(s)"), indirectly or directly, from the controller 144. The PMSC may be arranged to cause the power supply to the controller to be maintained as long as the PMSC receives at least one of the internal enable signal(s) and the external enable signal(s) 160. The PMSC may be arranged to cause the power supply to the controller to be cut if the PMSC receives neither the internal enable signal(s) nor the external enable signal(s).

In various applications the controller 144 needs to be occasionally reset. The system 100, and the controller, may be arranged for providing a scheduled reset, which can be initiated by the external system(s) 150, e.g. by the external system controller. The controller can thus be reset, e.g. by a power off/on hardware reset of the BMS, without interruption of electric current supply between the battery 110 and the load 120.

The controller 144 may be arranged to receive one or more enable signals 160 (herein also "the enable signal(s)") for causing the controller to be maintained operational. The enable signal(s) may correspond to the one or more of the external enable signal(s) as described above. The enable signal(s) may be provided directly or indirectly from the external system(s) 150, e.g. from the external system controller. The controller 144 may be arranged to, in response to the enable signal(s) missing, perform a shutdown of the controller. The shutdown may be a regular shutdown or a shutdown for an online reset of the BMS, e.g. as described below.

The regular shutdown of the controller 144 can be realized by simply switching off the external enable signal(s) 160. The controller can be arranged to, in response to the external enable signal(s) missing, start the regular shutdown, e.g. as a shutdown sequence, which may comprise one or more diagnostics routines and/or storing one or more parameters to a nonvolatile memory, e.g. of the controller. The controller may be arranged to cause, during the regular shutdown, the switch 130 to be opened to interrupt electric current supply between the battery and the load 120 before allowing, e.g. by switching of the internal enable signal(s) 162, the PMSC 142 to cause the power supply 164 to the controller to be cut off.

In contrast, the online reset of the BMS may comprise a shutdown of the controller 144 without causing the switch 130 to be opened and thus without interruption of electric current supply between the battery 110 and the load 120. The system 100 may be arranged to keep the switch closed during the online reset of the BMS to maintain electric current supply between the battery and the load while the controller is reset.

The system 100, and the controller 144 in particular, may be arranged to distinguish the regular shutdown from the online reset by using a reset signal 166. The controller may be arranged to receive the reset signal for indicating a reset of the controller, which reset can be understood as the online reset, when the controller is reset while maintaining a current supply between the battery 110 and the load 120. The reset signal may be a dedicated signal for indicating the controller that an online reset is to be performed. It may be provided, indirectly or directly, to the controller, from the external system(s) 150, e.g. from the external system controller. The reset signal may comprise or consist of a digital input triggered by an external system controller and/or a signal included into a Controller Area Network (CAN) message.

Based on the reset signal, the controller 144 may be arranged to facilitate the online reset of the BMS instead of the regular shutdown of the controller. Based on the reset signal, e.g. in response to receiving the reset signal and detecting the enable signal(s) missing, it may be arranged to cause the switch to be maintained in a closed position for connecting the battery to the load during the shutdown. This way, in response to the enable signal(s) missing, the controller is still arranged to perform a shutdown for the controller but the shutdown is not the regular shutdown, where the controller is arranged to cause the switch 130 to be opened to interrupt electric current supply between the battery 110 and the load 120 before causing the internal enable signal(s) 162 to be disabled and thereby allowing the power supply 164 to the controller to be cut off. Instead, the shutdown of the controller can be performed without the controller causing the switch to be opened. As an example, the controller may be arranged to maintain an output of the control signal(s) during the shutdown to cause the switch to be maintained in the closed position, and this can be continued until the end of the shutdown.

The controller 144 may be arranged to cause any or all of the following functions to be performed. The shutdown may still be performed as a shutdown sequence, which may comprise one or more diagnostics routines and/or storing one or more parameters to a nonvolatile memory, e.g. of the controller. The shutdown may be mostly, or completely equivalent to the regular shutdown, apart from not causing the switch 130 to be maintained in the closed position instead of causing the switch to be opened. During the shutdown, the internal enable signal(s) 162 may still be provided to the PMSC 142 for causing the controller to be powered. The internal enable signal(s) may be disabled while causing the switch to be maintained in the closed position, e.g. at the end of the shutdown. This allows the control signal(s) 168 to be automatically cut off when the controller is shut down, e.g. when the power supply 164 to the controller is cut off, in response to the internal enable signal(s) being disabled. This is in contrast to sending an explicit control signal from the controller to open the switch. The controller may be arranged to cause the internal enable signal(s) to be provided to the PMSC while the controller is operational, for example until an end of the shutdown sequence. If causing the internal enable signal(s) to be disabled is left as the last operation for the controller, it can be ensured that all operations are performed when the power supply to the controller is cut off in response to the internal enable signal(s) being disabled.

The system 100 may comprise a delay circuit 170 arranged to receive the control signal(s) from the controller 144. The delay circuit may be arranged to relay the control signal(s) 168 to the switch 130 for operating the switch. This way a switch-opening control signal may be provided to the switch when the control signal(s) indicate that the switch should be open and a switch-closing control signal may be provided to the switch when the control signal(s) indicate that the switch should be closed. The delay circuit may be arranged to relay the control signal(s) to the switch without delay.

However, the delay circuit 170 may be arranged to, in response to the control signal(s) 168 disappearing, maintain a switch-closing control signal 172 for keeping the switch 130 in the closed position. This allows the switch to be maintained closed during the online reset. The delay circuit may be arranged to maintain the switch-closing control signal for a first delay time. After this, it may cause the switch to be opened, e.g. by providing a switch-opening control signal to the switch or by ceasing a control-signal output to the switch, to ensure that the switch will be opened in case of a fault situation. In particular, the latter alternative provides increased reliability and efficiency as the absence of the switch-closing control signal is enough to cause the switch to be opened.

The delay circuit 170 may be arranged to provide a delay only when the control signal(s) 168 disappear. It may be arranged to relay the control signal(s) provided as its input without delay.

The delay circuit 170 may comprise or consist of a watchdog and/or a pulse counter circuit. It may be arranged to shut off its output to the switch after an expiration of a predefined delay time, e.g. the first delay time, from the last received valid drive signal, which is obtained from the control signal(s) 168. The first delay time can be long enough not to trigger the switch opening while the control signal(s) are cut off during the reset of the controller. On the other hand, the first delay time can be short enough to secure the opening of the switch within a fault tolerant time of the BMS, e.g. upon external safe state request or detection of battery system fault. The first delay time (tI) can thus be smaller than a fault tolerant time (tF) of the BMS minus a fault diagnostics time (tD) of the controller minus a switch-opening time (tO) of the controller, i.e. tI<tF−tD−tO. The fault diagnostics time of the controller is the time required for the controller to diagnose all types of faults in response to which the switch is to be opened. For example, if diagnosis of one or more faults requires several measurement cycles, the fault diagnostics time follows from the longest sequence of measurement cycles required, even if some other faults can be detected faster. The switch-opening time of the controller is the time required for the controller to cause the switch to be opened once it has diagnosed a fault as indicated above, i.e. it has recognized a reason to open the switch. The switch-opening time may correspond to a delay allowing the controller to communicate to the load that the switch is to be opened. This way, the load can have time to prepare for the disconnection of the battery from the load. The condition for the first delay time allows ensuring that once the controller becomes operational once it has been reset, there will always be a sufficient reaction time for the controller to orderly open the switch.

In a narrow embodiment, the system 100 is provided as the controller 144. In a broader embodiment, the system is provided as the battery management unit (BMU) 140. In a yet broader embodiment, the system is provided as the battery management system (BMS), which may comprise the BMU 140 and the switch 130. It may further comprise the battery 110 and/or a battery diagnostic system for providing the battery information 112 for the BMU. The system may comprise the delay circuit 170.

Figure 2A:
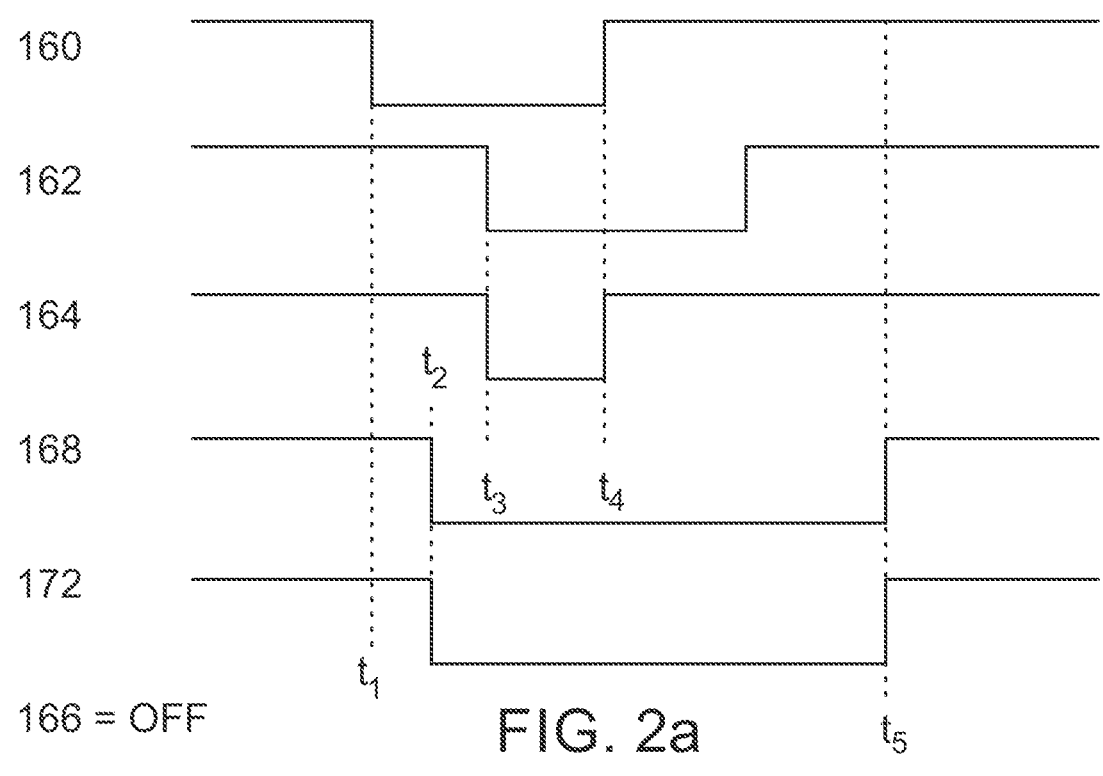
FIGS. 2a and 2b illustrate signal timing under two examples.
Figure 2B:
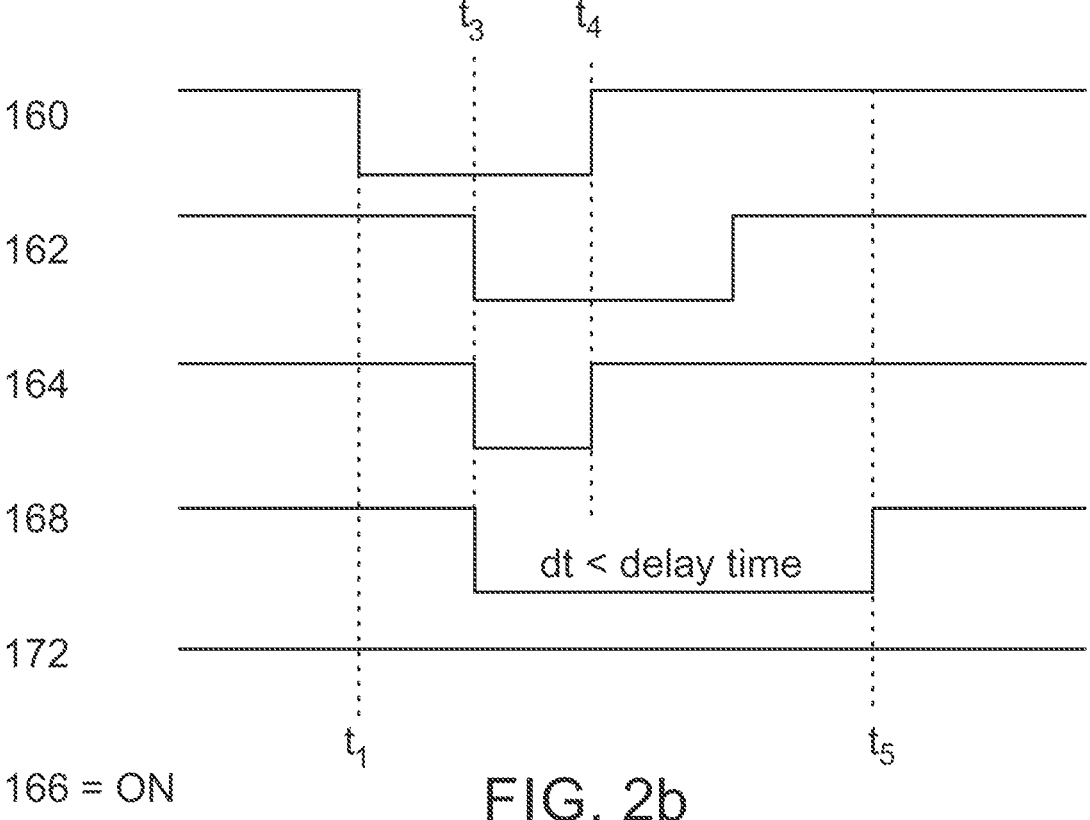

FIGS. 2a and 2b illustrate signal timing under two examples, according to which the system 100 and the controller 144 may be arranged to operate. In both figures, schematical examples of multiple signals 160, 162, 164, 168, 172 are illustrated as a function of time. Each signal has two states, which may be understood as an "on" state and an "off" state, the "on" state illustrated as the higher value and the "off" state as the lower value, between which the signals may change in time. However, the lower value may indicate either an active "off" signal being or the signal being absent. In the figures, time increases from left to right and is aligned for all the signals so that the horizontal dimension may be considered as a universal time axis for all the signals.

In FIG. 2a, an example of the regular shutdown is illustrated. The enable signal to the controller disappears at a first moment t1, for example due to the external system ceasing to provide the external enable signal(s) 160 to the controller. The external enable signal(s) may also disappear from the PMSC but since the controller can provide the internal enable signal(s) 162 to the PMSC, the controller continues to receive power and operate. In response to the enable signal missing, but because the reset signal 166 is not received by the controller (e.g. constantly "off", as illustrated), the controller begins to perform the regular shutdown. This may involve various acts, such as diagnostic acts, for example as mentioned above.

Later, at a second moment t2, the controller ceases to provide the control signal(s) 168 to maintain the switch closed and instead sends a switch-opening control signal for causing the switch to be opened. When this is received by the delay circuit, it ceases to maintain the switch-closing control signal 172 so the switch becomes opened. This may take place without delay so substantially at the second moment t2 or soon thereafter.

Later, at a third moment t3, the controller causes the internal enable signal(s) 162 to be disabled. In response, the PMSC at the third moment t3 receives neither the external enable signal(s) 160 nor the internal enable signal(s) and therefore causes the power supply 164 to the controller to be cut off, which may take place without delay so substantially at the third moment t3 or soon thereafter.

Later, at a fourth moment t4, the enable signal to the controller is restored, for example due to the external system again providing the external enable signal(s) 160 to the controller. In response, the power supply 164 to the controller is restored, e.g. because the PMSC now receives the external enable signal(s), even though the internal enable signal(s) 162 are still missing. Again, this may take place without delay so substantially at the fourth moment t4 or soon thereafter.

Because the power supply 164 is restored to the controller, it will restart and, after some time, restore the internal enable signal(s) 162. At a fifth moment t5, it will also restore the control signal(s) 168 to close the switch. When the control signal(s) are received by the delay circuit, the delay circuit can start maintaining the switch-closing control signal 172 so the switch is closed. This may take place without delay so substantially at the fifth moment t5 or soon thereafter.

In FIG. 2b, an example of the shutdown, which allows facilitating the online reset of the BMS, is illustrated. In this case, the reset signal 166 for indicating the reset of the controller is provided to the controller, for example from the external system(s) such as the external system controller.

Here, the enable signal to the controller disappears at a first moment t1, for example due to the external system ceasing to provide the external enable signal(s) 160 to the controller. The external enable signal(s) may also disappear from the PMSC but since the controller can provide the internal enable signal(s) 162 to the PMSC, the controller continues to receive power and operate. In response to the enable signal missing, but because the reset signal 166 has been received by the controller (e.g. constantly "on", as illustrated), the controller begins to perform the shutdown for resetting the controller without interrupting current supply between the battery and the load. This may involve various acts, such as diagnostic acts, for example as mentioned above.

The shutdown can be performed maintaining the output of the control signal(s) 168. Because of this, the delay circuit can also maintain the switch-closing control signal 172 (e.g. constantly "on", as illustrated) so the switch is maintained closed.

At a third moment t3, the controller causes the internal enable signal(s) 162 to be disabled, while still causing the switch to be maintained in the closed position (e.g. by maintaining the output of the control signal(s) 168). In response, the PMSC at the third moment t3 receives neither the external enable signal(s) 160 nor the internal enable signal(s) and therefore causes the power supply 164 to the controller to be cut off, which may take place without delay so substantially at the third moment t3 or soon thereafter. As the power supply 164 is cut off, the controller can no longer maintain the control signal(s) 168, which are thus also cut off.

Later, at a fourth moment t4, the enable signal to the controller is restored, for example due to the external system again providing the external enable signal(s) 160 to the controller. In response, the power supply 164 to the controller is restored, e.g. because the PMSC now receives the external enable signal(s), even though the internal enable signal(s) 162 are still missing. Again, this may take place without delay so substantially at the fourth moment t4 or soon thereafter.

Because the power supply 164 is restored to the controller 144, it will restart and, after some time, restore the internal enable signal(s) 162. At a fifth moment t5, it will also restore the control signal(s) 168. In the illustrated example, the time the control signal(s) were cut off (i.e. dt=t5–t3) is smaller than the first delay time (illustrated as "dt<delay time") so the switch-closing control signal 172 was maintained during the reset of the controller. Accordingly, the switch in such a situation would be maintained closed during the reset.

However, if the time the control signal(s) were cut off was larger than the first delay time (i.e. dt>first delay time), the situation can be different. The delay circuit may be arranged to cease maintaining the switch-closing control signal 172 when the first delay time has passed after the control signal(s) are cut off (i.e. at moment t=t3+first delay time). The delay circuit may thus cause the switch to open, e.g. by providing a switch-opening control signal to the switch or by ceasing a control-signal output to the switch. In such a case, the restoration of the control signal(s) 168 may again restore also the switch-closing control signal 172 to cause the switch to be closed.

In general, the controller may 144 be arranged to perform the shutdown and then restart so that a reset for the controller is performed. For this purpose, the system 100 may be arranged to restore the enable signal 160, e.g. the external enable signal(s), to the controller. This can be done during or after the shutdown. For example, the controller may be arranged to complete the shutdown once the enable signal has been initially missed, even if it is later restored during the shutdown. In such a case, it may be that the power supply 164 to the controller is not cut off at all and the controller will immediately restart after the shutdown. For illustrative purposes, the examples provided with reference to FIGS. 2a and 2b involve a period where the power supply 164 is in "off" state but similar logic may also be followed when no interruption to the power supply is experienced.

Figure 3:
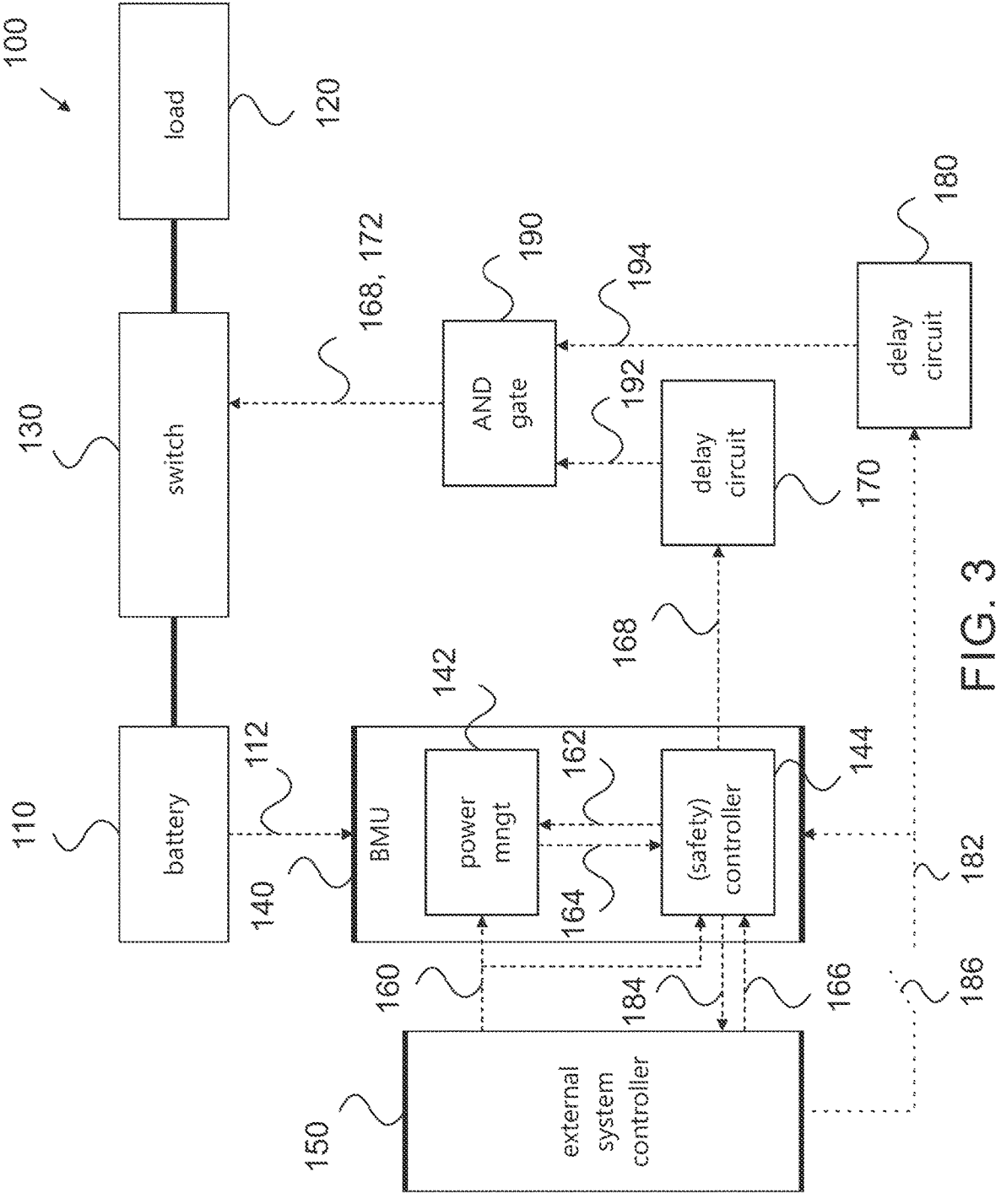
FIG. 3 illustrates a system according to another example.

FIG. 3 illustrates an example, where the system 100 comprises an additional delay circuit 180. The additional delay circuit may be arranged to receive one or more status signals 182 (herein also "the status signal(s)"), e.g. from the external system controller 150 indicating system status. This system status may be indicative of any or all of the following: status of the external system controller, status of the controller, status of the BMU, status of the battery and/or status of one or more electric connections of the system. The system may also comprise one or more contactors 186, the status of which may be indicated by the system status.

The system 100 may be arranged to cause the switch to open unless both the delay circuit 170 and the additional delay circuit 180 output a switch-closing control signal 192, 194. Accordingly, this allows providing an extra layer of protection for the system, which allows taking into account the system status for operating the switch. The system may comprise a logical AND-gate 190 for merging control signals from the first delay circuit and the additional delay circuit and causing the merged control signal to be provided for operating the switch. With such an AND-gate, the output is a switch-closing control signal 172 only if both inputs are switch-closing control signals.

The additional delay circuit 180 may be arranged to maintain a switch-closing control signal for keeping the switch in the closed position for a second delay time (tII) in response to the status signal(s) 182 disappearing and in response to the status signal(s) 182 indicating a status problem of the BMS. The additional delay circuit may be arranged to provide a delay both when the status signal(s) 168 disappear from its input and in response to the status signal(s) 168 being negative. It may be arranged to relay the status signal(s) provided as its input without delay when the status signal(s) correspond to a switch-closing control signal. In an example, the status signal(s) are provided as square wave signals.

The second delay time can thus be smaller than the fault tolerant time (tF) of the BMS minus a switch-opening time (tO) of the controller, i.e. tII<tF–tO. However, the second delay time may also be equal or larger to the first delay time. This allows the online reset to be facilitated for the controller, while the delay for the second delay circuit may be minimized.

The status signal(s) may be provided from the external system controller 150 also to the controller 144 to allow the controller to account for the system status. Conversely, the controller may be arranged to provide status information 184 to the external system controller.

The additional delay circuit 180 may be provided as a part of a HVIL (high voltage interlock loop or hazardous voltage interlock loop) circuit. The status information 184 may comprise or consist of a first HVIL signal such as a HVIL out signal from the controller. Similarly, the external system controller may be arranged to provide a second HVIL signal such as a HVIL in signal to the controller. This second HVIL signal may correspond to the status signal(s) 182. The controller can be arranged to provide the first HVIL signal as a positive signal when it observes the system 100 functioning normally. Similarly, the controller can be arranged to provide the first HVIL signal as a negative signal when it observes the system 100 functioning abnormally. The external system controller 150 can be arranged to provide the second HVIL signal as a positive signal when it observes the system 100 functioning normally, for example based on the first HVIL signal. The external system controller 150 can be arranged to provide the second HVIL signal as a negative signal when it observes the system 100 functioning abnormally, for example based on the first HVIL signal. However, the second HVIL signal being positive or negative may alternatively or additionally be based on various factors, such as whether one or more connectors of the system are working and/or whether the external system controller itself is working. Providing the second HVIL signal to the controller allows the controller to monitor the status of the system, e.g. so that the controller receives information when the switch is opened as caused by the external system controller.

The system 100 can thus be arranged such that both the controller 144 and the external system controller 150 can independently of each other cause the switch 130 to be opened. The controller may be arranged to use the status information 184 to communicate to the external system controller that the controller has caused the switch to be opened. The external system controller may be arranged to use the status signal(s) 182 to communicate to the controller that the external system controller has caused the switch to be opened. The logical AND-gate 190 can be used to prevent either of the controller or the external system controller from being alone able to maintain the switch closed.

Figure 4:
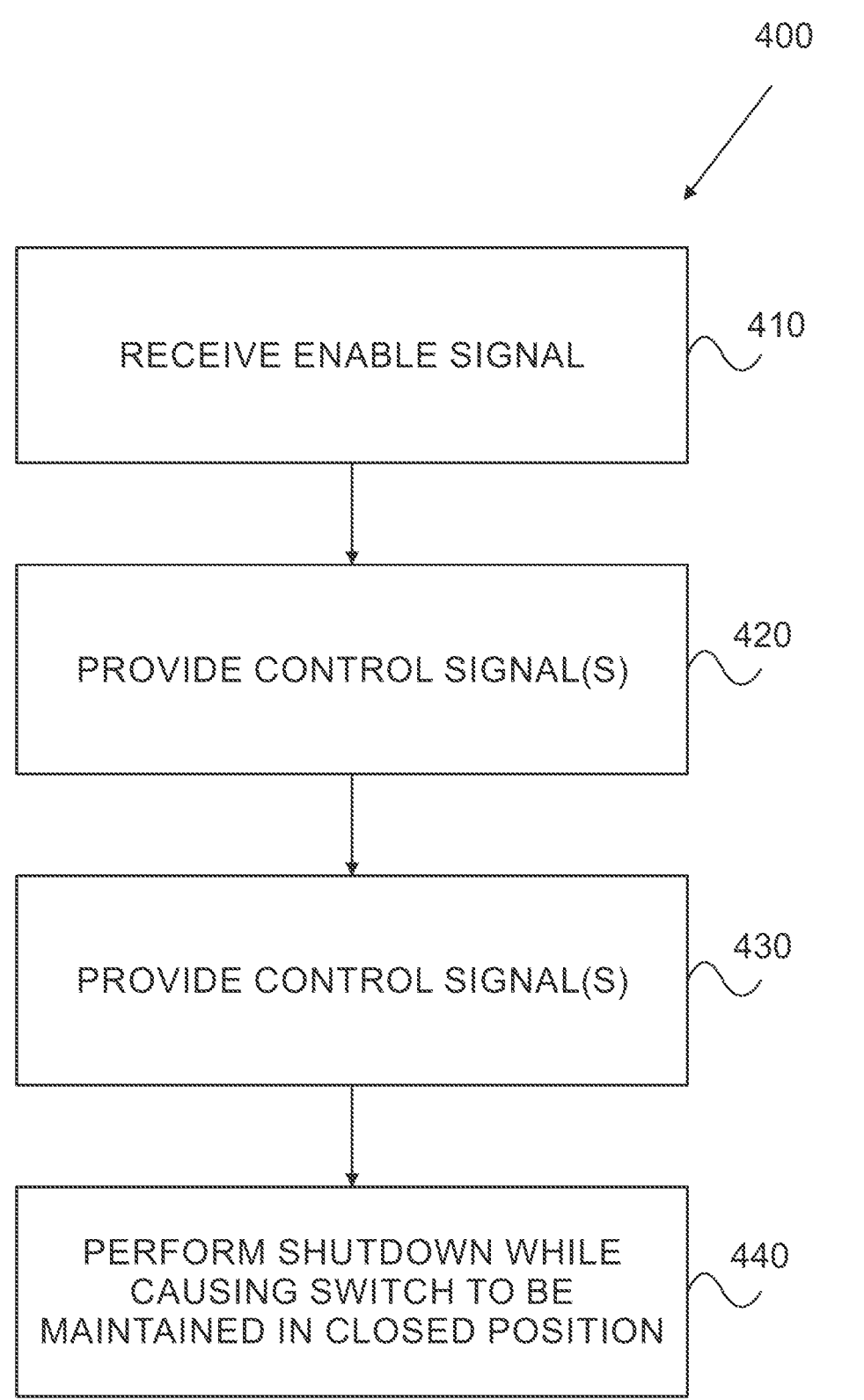
FIG. 4 illustrates a method according to an example.

FIG. 4 illustrates a method 400 according to an example. The method can be used for a system such as a BMS, e.g. for operating the system. The system may be a system 100 in accordance with any of the examples disclosed herein.

The method 400 may comprise receiving 410 an enable signal at a controller, such as a safety controller, for causing the controller to be maintained operational. The method may further comprise providing 420 one or more control signals from the controller for operating a switch for connecting a battery to a load. The method may comprise receiving 430 a reset signal at the controller for indicating a reset of the controller. Finally, the method may comprise, in response to the enable signal missing, performing 440 a shutdown for the controller, while, based on the reset signal, causing the switch to be maintained in a closed position for connecting the battery to the load.

All features mentioned in connection of the system 100 disclosed herein, such as the controller 144, may be applied also in connection with the method.

The controller 144 as described above may be implemented in software, hardware, application logic or a combination of software, hardware and application logic. The application logic, software or instruction set may be maintained on any one of various conventional computer-readable media. A "computer-readable medium" may be any media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer. The examples can store information relating to various processes described herein. This information can be stored in one or more memories, such as a hard disk, optical disk, magneto-optical disk, RAM, and the like. One or more databases can store the information used to implement the embodiments. The databases can be organized using data structures (e.g., records, tables, arrays, fields, graphs, trees, lists, and the like) included in one or more memories or storage devices listed herein. The databases may be located on one or more devices comprising local and/or remote devices such as servers. The processes described with respect to the embodiments can include appropriate data structures for storing data collected and/or generated by the processes of the devices and subsystems of the embodiments in one or more databases.

All or a portion of the embodiments can be implemented using one or more general purpose processors, microprocessors, digital signal processors, micro-controllers, and the like, programmed according to the teachings of the embodiments, as will be appreciated by those skilled in the computer and/or software art(s). Appropriate software can be readily prepared by programmers of ordinary skill based on the teachings of the embodiments, as will be appreciated by those skilled in the software art. In addition, the embodiments can be implemented by the preparation of application-specific integrated circuits or by interconnecting an appropriate network of conventional component circuits, as will be appreciated by those skilled in the electrical art(s). Thus, the embodiments are not limited to any specific combination of hardware and/or software.

The different functions discussed herein may be performed in a different order and/or concurrently with each other. Any example may be combined with another example unless explicitly disallowed.

Although the subject matter has been de-scribed in language specific to structural features and/or acts, it is to be understood that the subject matter defined in the appended claims is not necessarily limited to the specific features or acts de-scribed above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The term 'comprising' is used herein to mean including the method, blocks or elements identified, but that such blocks or elements do not comprise an exclusive list and a method or apparatus may contain additional blocks or elements.

Numerical descriptors such as 'first', 'second', and the like are used in this text simply as a way of differentiating between parts that otherwise have similar names. The numerical descriptors are not to be construed as indicating any particular order, such as an order of preference, manufacture, or occurrence in any particular structure.

Although the invention has been described in conjunction with a certain type of apparatus and/or method, it should be understood that the invention is not limited to any certain type of apparatus and/or method. While the present inventions have been described in connection with a number of examples, embodiments and implementations, the present inventions are not so limited, but rather cover various modifications, and equivalent arrangements, which fall within the purview of the claims. Although various examples have been described above with a certain degree of particularity, or with reference to one or more individual embodiments, those skilled in the art could make numerous alterations to the disclosed examples without departing from the scope of this specification.

That which is claimed:

1. A controller for a battery management system, the controller being arranged to:

provide one or more control signals arranged to operate a switch for connecting a battery to a load, receive an enable signal arranged to cause the controller to be maintained operational, receive a reset signal arranged to indicate a reset of the controller, and in response to the enable signal missing, perform a shutdown for the controller, and, based on the reset signal, cause the switch to be maintained in a closed position for connecting the battery to the load during the shutdown.

2. The controller according to claim 1, arranged to cause an internal enable signal to be provided to a power management system controller for causing the controller to be powered during the shutdown and to cause the internal enable signal to be disabled while causing the switch to be maintained in the closed position.

3. The controller according to claim 1, arranged to cause the switch to be maintained in the closed position by maintaining an output of the one or more control signals during the shutdown.

4. The controller according to claim 1, wherein the reset signal comprises a digital input triggered by an external system controller.

5. The controller according to claim 1, wherein the reset signal comprises a signal included into a Controller Area Network (CAN) message.

6. A system comprising the controller according to claim 1, and a delay circuit arranged to receive the one or more control signals from the controller and, in response to the one or more control signals disappearing, maintain a switch-closing control signal for keeping the switch in the closed position for a first delay time.

7. The system according to claim 6, wherein the first delay time is smaller than a fault tolerant time of the battery management system minus a fault diagnostics time of the controller minus a switch-opening time of the controller.

8. The system according to claim 6, wherein the delay circuit comprises a watchdog and/or a pulse counter circuit.

9. The system according to claim 6, comprising an additional delay circuit arranged to receive one or more status signals from an external system controller indicating system status, the system being arranged to cause the switch to open unless both the delay circuit and the additional delay circuit output a switch-closing control signal.

10. The system according to claim 9, wherein the additional delay circuit is arranged to maintain a switch-closing control signal for keeping the switch in the closed position for a second delay time in response to the one or more status signals disappearing and in response to the one or more status signals indicating a status problem of the battery management system.

11. A battery management system comprising the controller according to claim 1.

12. A method for a battery management system, the method comprising:

receiving an enable signal at a controller arranged to cause the controller to be maintained operational, providing one or more control signals from the controller arranged to operate a switch for connecting a battery to a load, receiving a reset signal at the controller arranged to indicate a reset of the controller, and in response to the enable signal missing, performing a shutdown for the controller, while, based on the reset signal, causing the switch to be maintained in a closed position for connecting the battery to the load.

13. The method according to claim 12, comprising:

causing an internal enable signal to be provided from the controller to a power management system controller for causing the controller to be powered during the shutdown, and causing the internal enable signal to be disabled while causing the switch to be maintained in the closed position.

14. The method according to claim 12, comprising causing the switch to be maintained in the closed position by maintaining an output of the one or more control signals from the controller during the shutdown.

15. A computer program product comprising instructions which, when the program is executed by a computer, cause the computer to cause the method of claim 12 be carried out.

16. A battery management system comprising the system according to claim 6.

*  *  *  *  *